United States Patent
Martiny et al.

(10) Patent No.: US 11,305,672 B2
(45) Date of Patent: Apr. 19, 2022

(54) SPINDLE DRIVE, AND COMFORT DRIVE HAVING A SPINDLE DRIVE

(71) Applicant: Robert Bosch GmbH, Stuttgart (DE)

(72) Inventors: Anna Martiny, Munich (DE); Christof Angerer, Lauf (DE); Enrique Adame Ramirez Raul, Ottersweier (DE); Gilles Peter, Morsbronn les Bains (FR); Markus Riedinger, Lichtenau-Ulm (DE)

(73) Assignee: ROBERT BOSCH GMBH, Stuttgart (DE)

( * ) Notice: Subject to any disclaimer, the term of this patent is extended or adjusted under 35 U.S.C. 154(b) by 560 days.

(21) Appl. No.: 16/356,523

(22) Filed: Mar. 18, 2019

(65) Prior Publication Data
US 2019/0291603 A1  Sep. 26, 2019

(30) Foreign Application Priority Data
Mar. 20, 2018 (DE) .................... 10 2018 204 194.6

(51) Int. Cl.
 *B60N 2/06* (2006.01)
 *F16H 1/16* (2006.01)
 *B60N 2/02* (2006.01)

(52) U.S. Cl.
 CPC .......... *B60N 2/067* (2013.01); *B60N 2/0232* (2013.01); *F16H 1/16* (2013.01); *B60N 2002/0236* (2013.01)

(58) Field of Classification Search
 CPC .................. B60N 2/067; B60N 2/0232; B60N 2002/0236; F16H 1/16
 USPC ........................................................ 74/89.14
 See application file for complete search history.

(56) References Cited

U.S. PATENT DOCUMENTS

| | | | | |
|---|---|---|---|---|
| 7,051,986 | B1* | 5/2006 | Taubmann | B60N 2/933 74/89.14 |
| 7,802,487 | B2* | 9/2010 | Knopfle | B60N 2/0232 297/344.11 |
| 8,113,074 | B2* | 2/2012 | Wohrle | B60N 2/0232 74/89.23 |
| 8,453,529 | B2* | 6/2013 | Birker | B60N 2/067 74/424.74 |
| 9,145,068 | B2* | 9/2015 | Bosecker | B60N 2/4214 |
| 9,840,167 | B2* | 12/2017 | Mixon | F16H 25/20 |

(Continued)

FOREIGN PATENT DOCUMENTS

| | | |
|---|---|---|
| DE | 102016203639 | 9/2017 |
| EP | 2114724 | 6/2013 |

*Primary Examiner* — Mark R Wendell
(74) *Attorney, Agent, or Firm* — Michael Best & Friedrich LLP

(57) ABSTRACT

A spindle drive (10), having a gear housing (15) which is connected to a drive motor (12), the gear housing (15) having a housing main body (16; 16*a*) and at least one housing cover (18; 18*a*, 20; 20*a*) which is connected to the housing main body (16; 16*a*), the housing main body (16; 16*a*) and the at least one housing cover (18; 18*a*, 20; 20*a*) delimiting a receiving space (24) for a drive element (25) which interacts with the drive motor (12), the drive element (25) being connected to a spindle (28) which penetrates the receiving space (24), means (37) being provided, in particular in the form of a shaft ring, for arranging the drive element (25) in the receiving space (24) in a manner which is free from axial play, and the means being arranged in a receiving region (39) in the receiving space (24).

20 Claims, 3 Drawing Sheets

(56) References Cited

U.S. PATENT DOCUMENTS

| | | | | |
|---|---|---|---|---|
| 2004/0012236 A1* | 1/2004 | Mallard | ............... | B60N 2/067 297/344.1 |
| 2004/0206195 A1* | 10/2004 | Landskron | ............ | B60N 2/929 74/89.14 |
| 2006/0249644 A1* | 11/2006 | Folliot | ............... | B60N 2/0232 248/429 |
| 2008/0163708 A1* | 7/2008 | Porinsky | ............ | F16H 25/2021 74/425 |
| 2011/0308340 A1* | 12/2011 | Bosecker | .............. | B60N 2/067 74/89.32 |
| 2013/0327168 A1* | 12/2013 | Wu | .................... | F16H 25/2015 74/89.37 |
| 2015/0360587 A1* | 12/2015 | Hoffmann | ........... | B60N 2/0232 248/429 |
| 2019/0009693 A1* | 1/2019 | Angerer | ................ | B60N 2/929 |
| 2019/0202322 A1* | 7/2019 | Napau | .................... | B60N 2/165 |
| 2019/0323585 A1* | 10/2019 | Nunez | ................. | F16H 57/031 |
| 2021/0016375 A1* | 1/2021 | Napau | .................... | B23F 9/082 |
| 2021/0114486 A1* | 4/2021 | Becker | ............... | B60N 2/0232 |

\* cited by examiner

SPINDLE DRIVE, AND COMFORT DRIVE HAVING A SPINDLE DRIVE

BACKGROUND OF THE INVENTION

The invention relates to a spindle drive. Furthermore, the invention relates to a comfort drive having a spindle drive.

DE 10 2016 2003 639 A1 from the applicant has disclosed a spindle drive. The known spindle drive is distinguished by a gear housing of multiple-piece configuration which consists of a housing main body which can be connected to a drive motor, and two housing covers. The housing main body has a through opening for arranging a drive element in the form of a worm gear which is connected to a spindle. The through opening is delimited by the housing covers which delimit the through opening on the end side, in order to configure the receiving space for the drive element. Furthermore, for reasons, in particular, of low noise during operation, a spindle drive of this type requires means which load the drive element with an axial force within the receiving space of the gear housing in such a way that the drive element is arranged within the receiving space in a manner which is free from axial play. To this end, it is provided in the known document that a shaft spring or a shaft ring is arranged within the receiving space, and radially encloses a projection or axle stub which projects axially from the drive element. Furthermore, two bearing elements are provided in the receiving space in the form of thrust washers for the drive element and the worm gear, which thrust washers are selected from predefined thicknesses of thrust washers in a manner which is dependent on a measured axial play and serve, together with the shaft spring, to set/avoid the axial play.

The two thrust washers are additional components which have to be taken into consideration during the structural design of the spindle drive and/or the receiving space of the gear housing. Furthermore, the thrust washers and their selection bring about additional measuring and assembly complexity.

SUMMARY OF THE INVENTION

The spindle drive according to the invention has the advantage that the thrust washers which are provided in the prior art as additional, separate components can be dispensed with, and at least one element is instead provided which is provided for setting a defined size of a receiving region, in particular for a shaft ring. An element of this type according to the invention therefore makes a structurally different configuration or design of the gear housing possible in contrast to the thrust washers in the prior art, the element being, moreover, a particularly precise element which can be set in an accurate since infinitely variable manner by way of the provision of the threaded connection and an individually provided screw-in-depth which is associated with the latter. As a result, in particular, production tolerances of the relevant components can also be extended, since a greater spectrum of existing receiving regions can be set in practice via the element which is provided with the threaded connection in comparison with thrust washers.

In order to arrange the threaded connection on the gear housing in a manner which is as protected as possible against external mechanical influences, one preferred structural embodiment of the invention provides that the element has an external thread which interacts with an internal thread, the internal thread being configured on a wall, which delimits the receiving space, of the housing main body, or on a housing cover.

It is provided in one preferred structural development of the last proposal that the internal thread is configured on the housing main body over the entire height which runs in the direction of the rotational or longitudinal axis of the spindle, and that two elements are provided which are arranged on opposite end sides of the housing main body. A embodiment of this type therefore makes it possible to perform the adaptation of the receiving region for the shaft spring from opposite sides of the housing main body, and it is possible, moreover, that identical elements, for example, can be used which can be connected to the housing main body selectively on the one or the other end side.

In one structural design of the threaded connection which is of fundamentally different configuration than the above-described variants, it is provided that the element which serves to set the receiving region, in particular in the form of a housing cover, has an internal thread which interacts with an external thread which is configured on the housing main body. An embodiment of this type can be implemented structurally by virtue of the fact that the element is, for example, of pot-shaped configuration with a through opening for the spindle, the internal thread being configured on a radially circumferential wall of the element. A structural embodiment of this type has the advantage, in particular, that no thread has to be configured on the housing main body or its recess for receiving the drive element, which thread otherwise possibly has disadvantages, possibly for production reasons or else for functional reasons, in particular with regard to the mounting of the drive element.

Independently of the arrangement of the thread, it is very particularly preferred if the element is the housing cover. As a result, it is possible to dispense with separate elements for setting the receiving region for the shaft spring in the gear housing, with the result that, in addition to the limiting of the receiving space for receiving the drive element in the housing main part and/or the protection of the receiving space, the housing cover additionally assumes the function of setting the receiving region for the shaft spring. Moreover, a structural embodiment of this type has the special advantage that the additional fastening screws which are usually used in the prior art between the housing cover and the housing main body can be dispensed with, in particular if, for example, the threaded connection between the housing cover and the housing main body is secured or fixed and sealed via an adhesive, an ultrasonic weld or a laser weld.

As an alternative to the use of the housing cover for setting the size of the receiving region for the shaft spring, it is also conceivable, however, that a bearing element which serves to axially and/or radially mount the drive element at the same time serves to set the receiving region for the shaft spring in the receiving space. It is provided in this case that the element which represents the bearing element is preferably configured so as to be hat-shaped in cross section. A geometric embodiment of this type of the element has the advantage that the sleeve-shaped section of the bearing element can be provided with the corresponding (external) thread, and therefore the setting of the receiving region takes place via said thread, while at the same time the radially circumferential section of the bearing element, which section is arranged at a right angle from the sleeve-shaped section, serves to axially mount the drive element and/or the shaft spring. Furthermore, the sleeve-shaped region, in which the (external) thread is configured, can also serve to radially mount the drive element, by said (external) thread interacting, for example, with an internal thread which is configured on the housing main part or on the housing cover.

The element and the housing main body can be produced in an economically particularly simple manner and with sufficiently accurate precision if they consist of plastic and are configured as an injection molded part.

The invention also comprises a comfort drive, in particular a seat adjusting drive in a motor vehicle, having a spindle drive according to the invention as described above.

BRIEF DESCRIPTION OF THE DRAWINGS

Further advantages, features and details of the invention result from the following description of preferred exemplary embodiments and using the drawing, in which.

Identical elements or elements with an identical function are provided with the same reference numerals in the figures.

DETAILED DESCRIPTION

Figure 1:
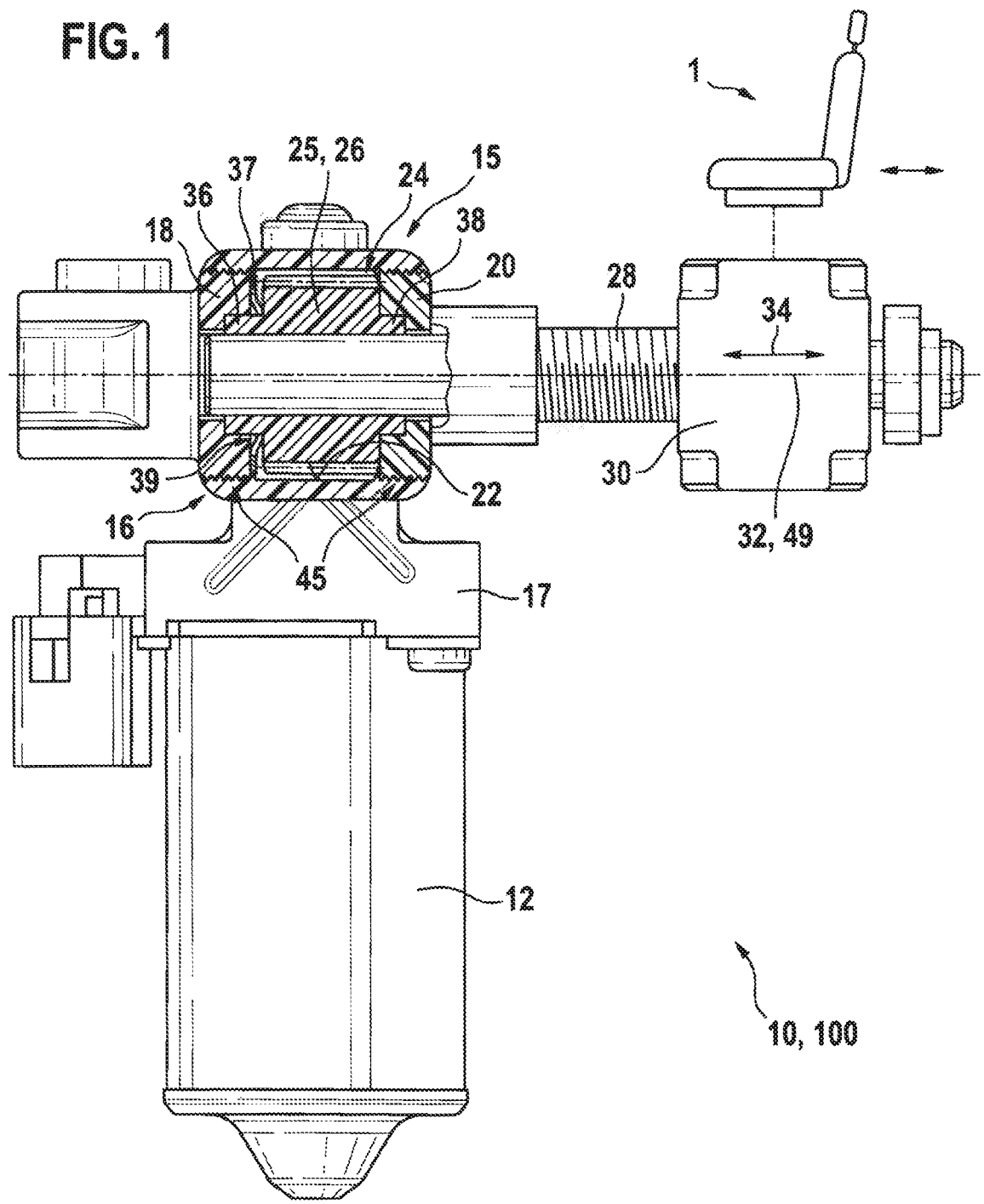
FIG. 1 shows a partially sectioned side view of a spindle drive according to the invention as a constituent part of a comfort drive for seat adjustment in a motor vehicle.

FIG. 1 shows a spindle drive 10 as a constituent part of a comfort drive 100 in a motor vehicle. The comfort drive 100 is configured, in particular, as a seat adjusting drive for adjusting a seat 1. As an alternative, however, the spindle drive 10 can also serve for steering column adjustment.

In a manner known per se, a spindle drive 10 comprises a drive motor 12 which is configured as an electric motor and is connected to a gear housing 15. The gear housing 15 which consists, in particular, of plastic and is configured as an injection molded part comprises a housing main body 16 with a connector flange 17, via which the housing main body 16 is connected to the drive motor 12. Furthermore, the gear housing 15 which is configured in multiple pieces comprises by way of example two housing covers 18, 20 of identical configuration which likewise consist of plastic and are configured as an injection molded part. FIG. 1 shows the two housing covers 18, 20 in a simplified manner. The housing main body 16 has a recess 22 which, together with the two housing covers 18, 20, delimits a receiving space 24 for a drive element 25. In accordance with DE 10 2016 2003 639 A1 from the applicant, the drive element 25 is configured as a worm gear 26 with an external toothing system, and is rotated via a drive gearwheel or a drive worm (not shown in the figures) which is connected to the drive motor 12.

The drive element 25 is connected fixedly to a spindle 28 so as to rotate with it, which spindle 28 consists of metal and penetrates the gear housing 15 and/or the two housing covers 18, 20. A spindle nut 30 is arranged on the spindle 28 outside the gear housing 15 spaced apart from the latter, which spindle nut 30 is in turn coupled at least indirectly to the element or seat 1 to be adjusted. In the case of a rotation of the spindle 28 about its longitudinal or rotational axis 32, the spindle nut 30 which is arranged non-rotatably in relation to the rotational axis 32 moves in the direction of the double arrow 34 in a manner which is dependent on the rotational direction of the spindle 28, and in the process at least indirectly moves the seat 1.

The drive element 25 which consists of plastic, in particular POM, is arranged within the receiving space 24 of the gear housing 15 in a manner which is free from axial play. To this end, the drive element 25 has in each case one axle stub 36, 38 in the axial direction, which axle stub 36, 38 serves for radial mounting in the respective housing cover 18, 20. Whereas the one end side of the drive element 25 bears axially (directly) against the housing cover 20, an annular receiving region 39 for receiving a shaft ring 37 is configured between the other housing cover 18 and that region of the drive element 25 of increased diameter. The shaft ring 37 serves to compensate for an axial play which is configured between the two housing covers 18, 20 and the drive element 25.

Figure 2:
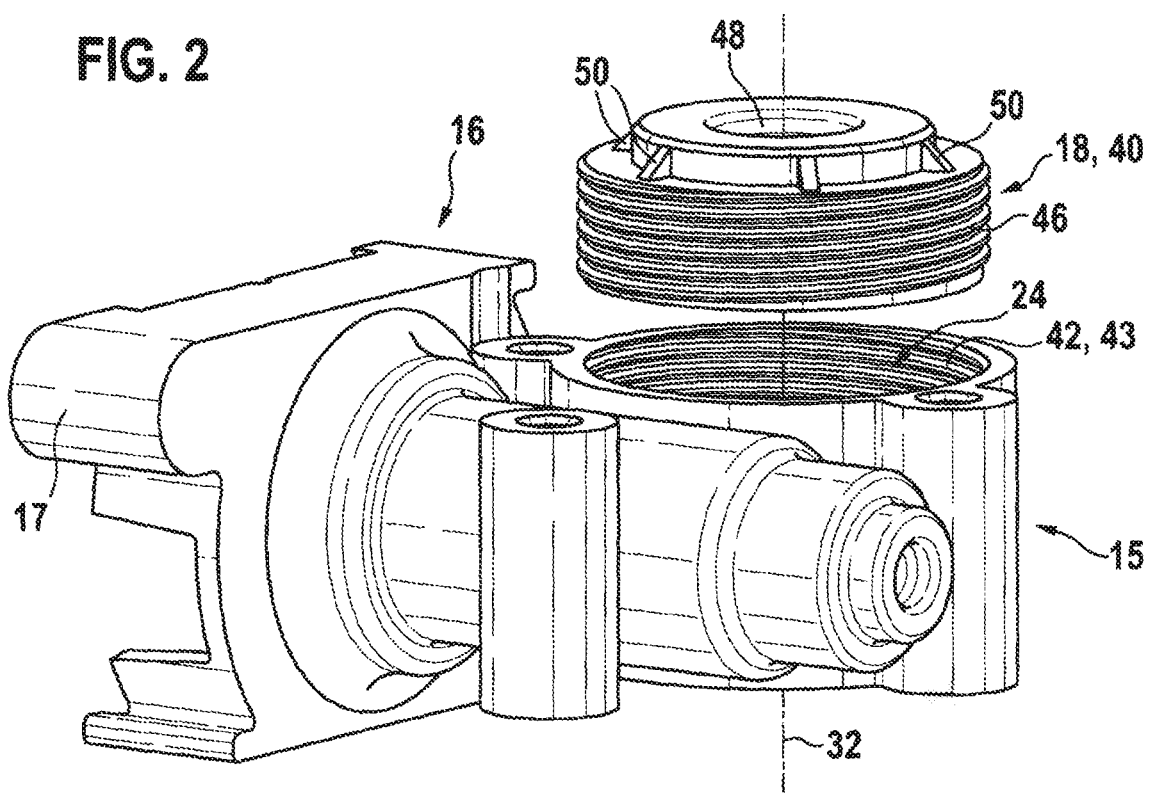
FIG. 2 shows parts of a gear housing as a constituent part of the spindle drive according to FIG. 1 in a perspective illustration.
Figure 3:
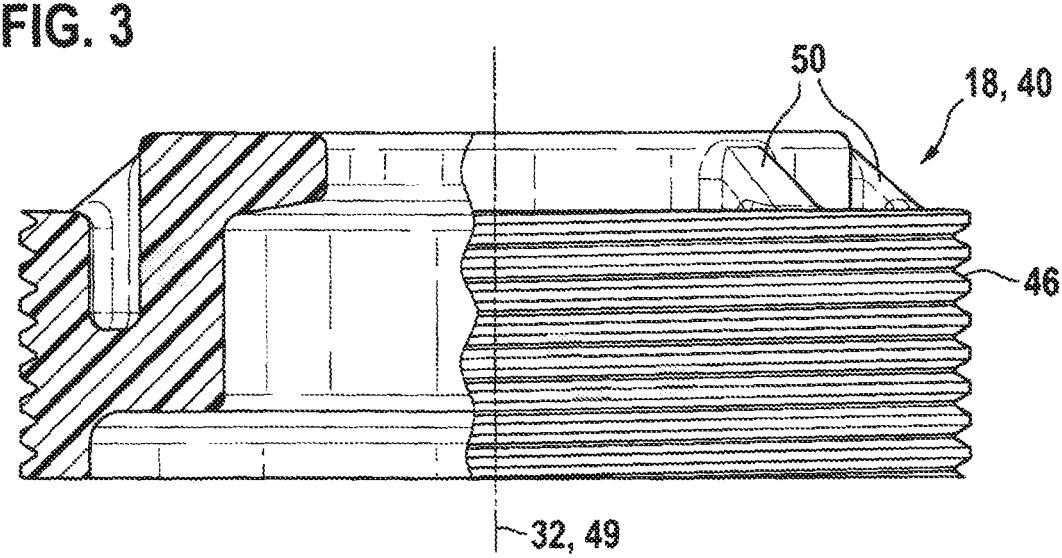
FIG. 3 shows a housing cover, as used in the case of the gear housing according to FIG. 2, in a partially sectioned side view.

It is essential to the invention that, as can be seen, in particular, from FIGS. 2 and 3, the respective housing cover 18, 20 (shown by way of example on the housing cover 18) configures an element 40 which serves to set the size of the receiving region 39 for the shaft ring 37 within the receiving space 24 of the gear housing 15. To this end, an internal thread 43 is formed on the housing main body 16, on an inner wall 42 of the housing main body 16 over the entire extent as viewed in the direction of the rotational axis 32 of the spindle 28. Said internal thread 43 is a constituent part of a threaded connection 45 which additionally comprises an external thread 46 which is configured on the outer circumference of the (annular) housing cover 18, 20. In the case of a rotation of the respective housing cover 18, 20 about the threaded connection 45 which is arranged coaxially with respect to the rotational axis 32, the housing cover 18, 20 can therefore be screwed axially into the housing main body 16 and/or the receiving space 24 to a greater or lesser extent in a manner which is dependent on the rotational direction of the housing cover 18, 20, with the result that the receiving region 39 for the shaft ring 37 can have a defined size. After the mounting of the shaft ring 37 in the receiving region 39 which has the defined size, the axial play of the drive element 25 is then set to zero.

In order to guide the spindle 28 through the respective housing cover 18, 20, the latter has in each case a through opening 48 which is arranged concentrically with respect to its longitudinal axis 49, the longitudinal axis 49 being arranged in turn concentrically with respect to the rotational axis 32 of the spindle 28 and/or with respect to the threaded connection 45. Furthermore, radially outwardly projecting projections 50 are configured on that end side of the housing cover 18, 20 which faces away from the housing main body 16, which projections 50 serve as a tool action surface for a tool (not shown), in order that the respective housing cover 18, 20 can be rotated by machine, in particular.

Figure 4:
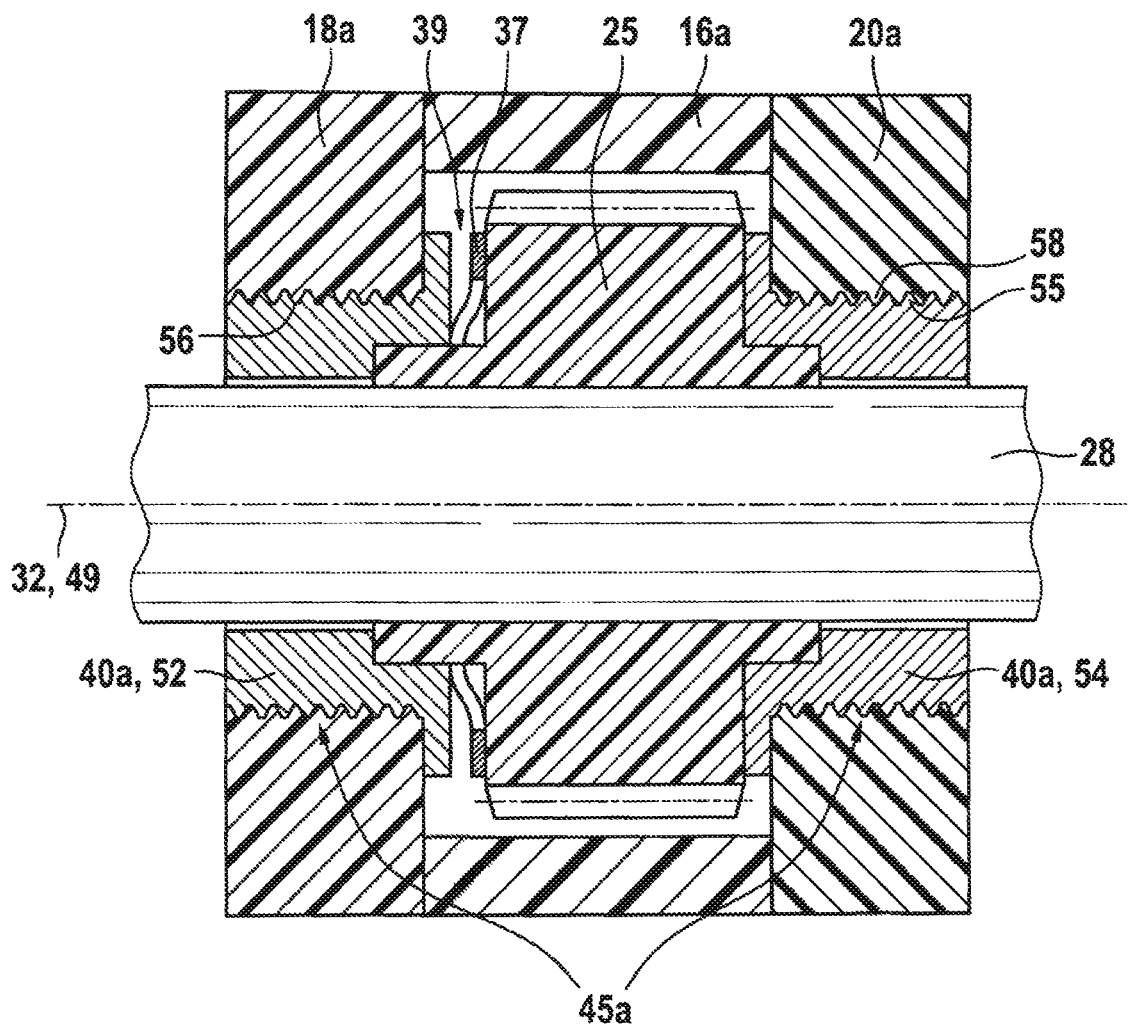
FIG. 4 shows a simplified longitudinal section through a gear housing in the case of a modified spindle drive.
Figure 5:
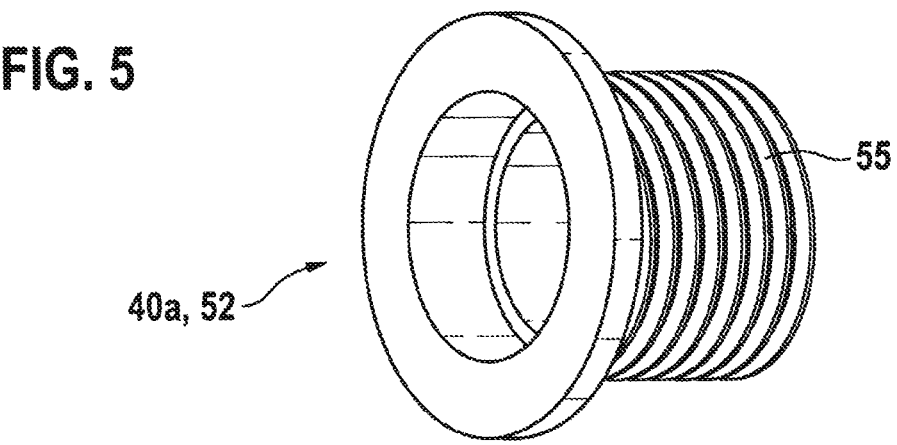
FIG. 5 shows an element which serves to set the axial play and to mount the spindle, as used in FIG. 4, in a perspective illustration.

In the case of the exemplary embodiment which is shown in FIGS. 4 and 5, the element 40a is not a constituent part of the housing cover 18a, 20a, but rather is a constituent part of in each case one bearing element 52, 54 for axially and/or radially mounting the drive element 25 and/or the spindle 28. In accordance with the illustration of FIG. 5, the bearing element 52, 54 which is of substantially hat-shaped cross section has an external thread 55 in its sleeve-shaped section for mounting the spindle 28, which external thread 55 interacts by way of example with an internal thread 58 which is configured in the region of a through opening 56 of the housing cover 18a, 20a, in order to configure the threaded connection 45a. The housing cover 18a, 20a is in turn connected to the housing main body 16*a* in a manner which is not shown, in particular via fastening screws, as known per se from the prior art.

The above-described spindle drive 10 can be adapted or modified in a wide variety of ways, without departing from the concept of the invention. It is thus conceivable, for example, in the case of the embodiment in which the element 40 is formed by way of the housing cover 18, 20, to configure the housing cover 18, 20 with an approximately hat-shaped cross section, an internal thread being configured on the inner wall of the radially circumferential section, which internal thread in turn interacts with an external thread which is configured in a part region, in particular in the region of the end sides of the housing main body 16. The invention is also not to be restricted to the use of a shaft ring 37 for axial play setting. Rather, elements which have resilient or elastic properties and are of different configuration can also be provided for this purpose.

What is claimed is:

1. A spindle drive (10) comprising
a gear housing (15) which is connected to a drive motor (12), the gear housing (15) having a housing main body (16; 16*a*) and a housing cover (18; 18*a*, 20; 20*a*) which is connected to the housing main body (16; 16*a*), the housing main body (16; 16*a*) and the housing cover (18; 18*a*, 20; 20*a*) delimiting a receiving space (24) for a drive element (25) which interacts with the drive motor (12), the drive element (25) being connected to a spindle (28) which penetrates the receiving space (24), and
means (37) for arranging the drive element (25) in the receiving space (24) in a manner which is free from axial play, the means (37) being arranged in a receiving region (39) in the receiving space (24),
wherein means for adjusting the size of the receiving region (39) are configured to, via a threaded connection (45; 45*a*) with the housing cover (18), set and adjust the size of the receiving region (39) along a direction that runs coaxially with respect to a rotational axis (32) of the spindle (28).

2. The spindle drive according to claim 1, characterized in that the threaded connection (45) comprises an external thread (46) on the housing cover (18) and an internal thread (43) on an inner wall (42) of the housing main body (16), wherein a centerline of the threaded connection (45; 45*a*) is collinear with the rotational axis (32) of the spindle (28).

3. The spindle drive according to claim 2, characterized in that the internal thread (43) extends over an entire height of the main housing body (16), wherein the height runs in a direction of the rotational axis (32) of the spindle (28), and in that the housing cover (18) is a first housing cover, and wherein a second housing cover (18) is provided, wherein the first and second housing covers are arranged on opposite end sides of the housing main body (16).

4. The spindle drive according to claim 2, characterized in that the housing main body (16) and the housing cover (18) consist of plastic and are configured as an injection molded part.

5. The spindle drive according to claim 2, characterized in that the housing cover (18) is of annular configuration with a through opening (48) for the spindle (28).

6. The spindle drive according to claim 5, characterized in that the housing cover (18) has an axial thrust face for the drive element (25).

7. The spindle drive according to claim 2, characterized in that the means (37) for arranging the drive element (25) in the receiving space (24) is an axial spring element which is configured to be pressed axially against the drive element (25) by the housing cover (18) and by way of the threaded connection (45).

8. The spindle drive according to claim 1, characterized in that the drive element (25) is a worm gear and consists of plastic.

9. The spindle drive according to claim 1, wherein the means (37) for arranging the drive element (25) in the receiving space (24) includes a shaft ring.

10. The spindle drive according to claim 1, characterized in that the drive element (25) is a worm gear and consists of POM.

11. The spindle drive according to claim 1, characterized in that the means for adjusting the size of the receiving region (39) includes an element (40*a*), wherein the threaded connection (45*a*) comprises an external thread (55) on the element (40*a*) and an internal thread (58) on the housing cover (18*a*), and wherein a centerline of the threaded connection (45*a*) is collinear with the rotational axis (32) of the spindle (28), and wherein the element (40*a*) is of annular configuration with a through opening (48) for the spindle (28).

12. The spindle drive according to claim 11, characterized in that the element (40*a*) is a bearing element (52, 54).

13. The spindle drive according to claim 12, characterized in that the bearing element (52, 54) is hat-shaped in cross section.

14. The spindle drive according to claim 13, characterized in that the means (37) for arranging the drive element (25) in the receiving space (24) is an axial spring element compressed between the drive element (25) and a brim-like portion of the hat-shaped bearing element having a largest radius from the rotational axis (32) of the spindle (28).

15. The spindle drive according to claim 12, characterized in that the bearing element (52, 54) is a first bearing element, wherein a second bearing element (52, 54) is provided, and wherein the first and second bearing elements are arranged on opposite end sides of the housing main body (16).

16. The spindle drive according to claim 11, characterized in that the housing main body (16) and the element (40*a*) consist of plastic and are configured as an injection molded part.

17. The spindle drive according to claim 11, characterized in that the element (40*a*) has an axial thrust face for the drive element (25).

18. The spindle drive according to claim 11, characterized in that the means (37) for arranging the drive element (25) in the receiving space (24) is an axial spring element which is configured to be pressed axially against the drive element (25) by the element (40*a*) and by way of the threaded connection (45*a*).

19. A comfort drive (100), having a spindle drive (10) which is configured according to claim 1.

20. A seat adjusting drive, having a spindle drive (10) which is configured according to claim 1.

* * * * *